United States Patent
Tezuka et al.

(10) Patent No.: US 7,306,717 B2
(45) Date of Patent: Dec. 11, 2007

(54) WATER TREATMENT APPARATUS

(75) Inventors: Keiji Tezuka, Aichi (JP); Mitsuyuki Yamada, Aichi (JP); Shin-ichi Mizuno, Aichi (JP); Koichi Matsuo, Aichi (JP); Tsuyoshi Ichinari, Aichi (JP); Yohei Aizawa, Aichi (JP)

(73) Assignee: Fuji Clean Co., Aichi (JP)

( * ) Notice: Subject to any disclaimer, the term of this patent is extended or adjusted under 35 U.S.C. 154(b) by 165 days.

(21) Appl. No.: 11/140,604

(22) Filed: May 31, 2005

(65) Prior Publication Data

US 2005/0269252 A1   Dec. 8, 2005

(30) Foreign Application Priority Data

Jun. 4, 2004   (JP) .............................. 2004-167264

(51) Int. Cl.
   *C02F 3/06*   (2006.01)
(52) U.S. Cl. .................... 210/151; 210/202; 210/532.2
(58) Field of Classification Search ................ 210/150, 210/151, 615, 617, 202, 259, 261, 532.2
   See application file for complete search history.

(56) References Cited

U.S. PATENT DOCUMENTS

| | | | | |
|---|---|---|---|---|
| 2,051,727 A | * | 8/1936 | Levine et al. ............... | 210/150 |
| 3,232,865 A | * | 2/1966 | Quinn et al. ................. | 210/615 |
| 3,882,027 A | * | 5/1975 | Lunt .......................... | 210/150 |
| 4,561,974 A | * | 12/1985 | Bernard et al. .............. | 210/151 |
| 4,800,021 A | * | 1/1989 | Desbos ....................... | 210/150 |
| 4,895,645 A | * | 1/1990 | Zorich, Jr. .................. | 210/150 |
| 4,929,349 A | * | 5/1990 | Beckman .................... | 210/151 |
| 4,933,076 A | * | 6/1990 | Oshima et al. .............. | 210/151 |
| 4,997,568 A | * | 3/1991 | Vandervelde et al. ....... | 210/150 |
| 5,084,164 A | * | 1/1992 | Del Rosario ................ | 210/151 |
| 5,242,582 A | * | 9/1993 | Marioni ..................... | 210/151 |
| 6,100,081 A | * | 8/2000 | Buelna ....................... | 210/151 |
| 6,123,840 A | * | 9/2000 | Suzuki et al. ............... | 210/151 |
| 6,177,004 B1 | * | 1/2001 | Bracone, Jr. ................ | 210/151 |
| 6,238,563 B1 | * | 5/2001 | Carroll et al. .............. | 210/151 |
| 6,808,622 B2 | * | 10/2004 | Okamoto et al. ........... | 210/151 |

FOREIGN PATENT DOCUMENTS

JP   10 277576   10/1998

* cited by examiner

*Primary Examiner*—Christopher Upton
(74) *Attorney, Agent, or Firm*—Dennison, Schultz & MacDonald

(57) ABSTRACT

It is an object of the present teachings to provide a technique for effectively providing a packed region in a water treatment apparatus in which the packed region is provided in a path of water to be treated and is filled with biomembrane-deposited members. According to the present invention, a representative water treatment apparatus may include a packed region provided in a path of water to be treated, a first packed part arranged in the packed region, a block of first biomembrane-deposited members that are packed in the first packed part, a second packed part that is arranged under the first packed part, and a plurality of second biomembrane-deposited members that are packed in the second packed part. According to the invention, the first biomembrane-deposited members are configured to prevent the second biomembrane-deposited members from moving into the first packed part by pressing the second biomembrane-deposited members from above. Therefore, the packed region can be formed in simpler structure without adopting any specific devices exclusively designed to keep the second biomembrane-deposited members within the second packed part.

18 Claims, 5 Drawing Sheets

WATER TREATMENT APPARATUS

BACKGROUND OF THE INVENTION

1. Field of the Invention

The present invention relates to a water treatment apparatus, and more particularly, to a technique for constructing a water treatment apparatus having a packed region packed with biomembrane-deposited members.

2. Description of the Related Art

A water treatment technique for aerobically treating sewage such as domestic or industrial wastewater is known. For example, Japanese laid-open patent publication No. 10-277576 discloses a wastewater treatment apparatus of this type. In this apparatus, a packed region is provided in a path of water to be treated and is packed with members like contact filter media. Diffused air is supplied from an air diffuser into the packed region. In this manner, water is aerobically treated. On the other hand, however, in a water treatment apparatus of this type, the packed region is desired to be efficiently constructed.

SUMMARY OF THE INVENTION

Accordingly, it is an object of the present teachings to provide a technique for effectively providing a packed region in a water treatment apparatus in which the packed region is provided in a path of water to be treated and is filled with biomembrane-deposited members.

According to the present invention, a representative water treatment apparatus may include a packed region provided in a path of water to be treated, a first packed part arranged in the packed region, a block of first biomembrane-deposited members that are packed in the first packed part, a second packed part that is arranged under the first packed part, and a plurality of second biomembrane-deposited members that are packed in the second packed part. Such apparatus is preferably utilized as a technique for constructing a water treatment apparatus that treats domestic wastewater, industrial wastewater or other similar water to be treated The "block" of first biomembrane-deposited members preferably embraces the state in which the first biomembrane-deposited members can be handled in the form of one block member. Typically, the manner of "packing the block of the first biomembrane-deposited members" in this invention embraces the manner of connecting the biomembrane-deposited members in the form of a plurality of plate members to each other into one block and then packing the block member into the first packed part. It also embraces the manner of packing the biomembrane-deposited members in the form of a plurality of granular or spherical members into one box-like member.

According to the invention, the first biomembrane-deposited members are configured to prevent the second biomembrane-deposited members from moving into the first packed part by pressing the second biomembrane-deposited members from above. Thus, the first biomembrane-deposited members packed in the first packed part perform not only a function of treating the water to be treated but also a function of locking the plurality of the second biomembrane-deposited members within the second packed part at a time by pressing on the second biomembrane-deposited members from above. Therefore, the packed region can be formed in simpler structure without adopting any specific devices exclusively designed to keep the second biomembrane-deposited members within the second packed pare Further, according to the invention, the apparatus may be constructed such that water to be treated flows downward through the first packed part forming the upper layer of the packed region and then through the second packed part forming the lower layer. Alternatively, it may be constructed such that the water flows upward through the second packed part and then through the first packed pare Other objects, features and advantages of the present invention will be readily understood after reading the following detailed description together with the accompanying drawings and the claims,

BRIEF DESCRIPTION OF THE DRAWINGS

FIG. 4 is a perspective view showing that a second packed part 152 of the packed region 150a shown in FIG. 3 is being packed with a plurality of filter media 152a.

FIG. 5 is a perspective view showing that a first packed part 151 of the packed region 150a shown in FIG. 3 is being packed with a block of corrugated plate-like contact materials 151a.

DETAILED DESCRIPTION OF THE INVENTION

A detailed embodiment of the present invention will now be explained with reference to the drawings. This embodiment provides a wastewater treatment apparatus for treating domestic wastewater.

Each of the additional features and method steps disclosed above and below may be utilized separately or in conjunction with other features and method steps to provide and manufacture improved waste water treatment apparatus and method for using such apparatus and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
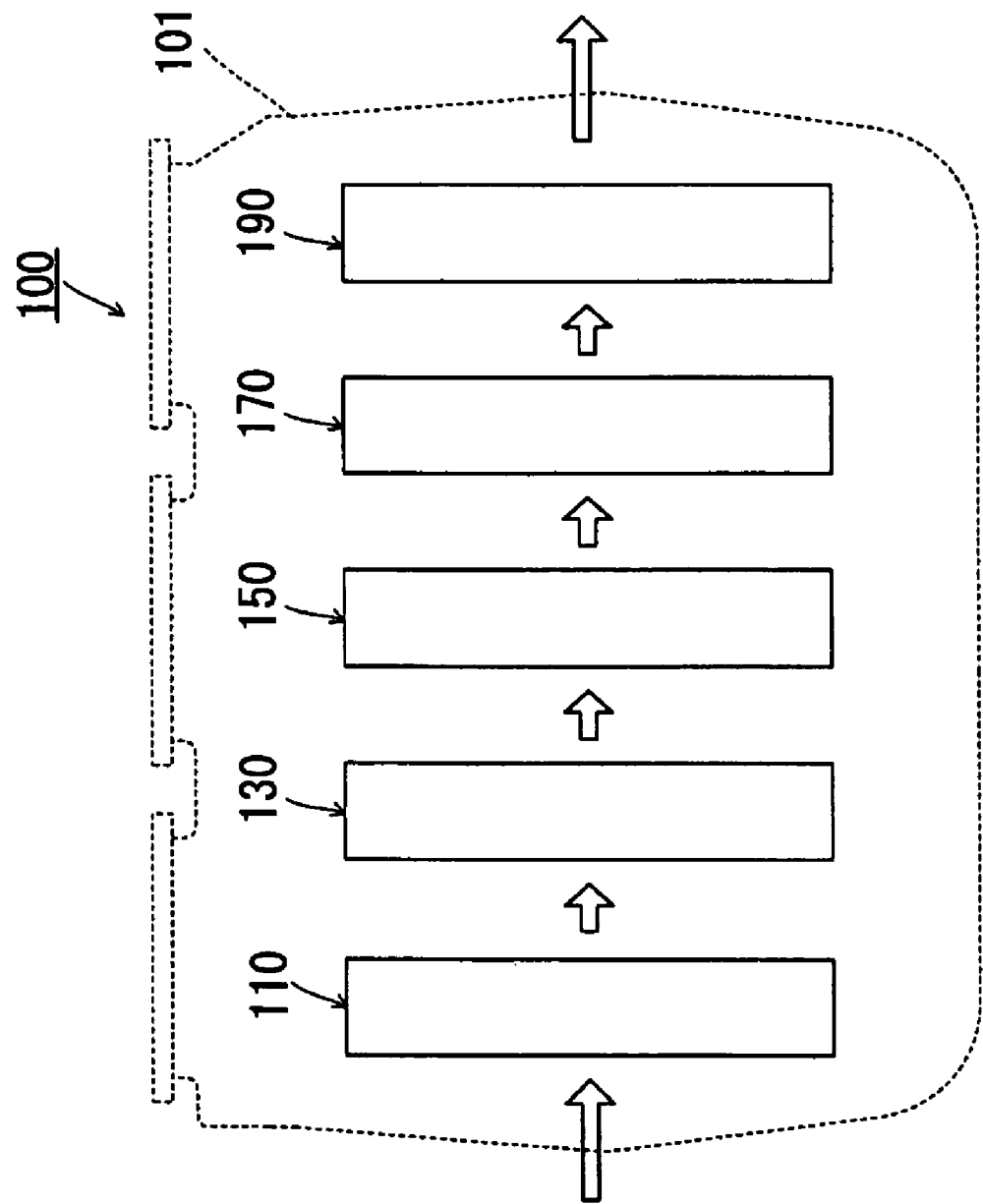
FIG. 1 shows a flow of water to be treated by a wastewater treatment apparatus 100 according to an embodiment of the invention.

FIG. 1 shows a flow of water to be treated by a wastewater treatment apparatus 100 embodied as a representative embodiment of the present teachings.

As shown in FIG. 1, the wastewater treatment apparatus 100 has various purifying mechanisms within a tank body 101. Specifically, the tank body 101 houses, from the upstream side (left to right as viewed in FIG. 1) in order of the treatment procedures, a foreign matter removing tank 110, an anaerobic filter bed tank 130, a contact filter bed tank 150, a treated water tank 170 and a sterilizing chamber 190. Wastewater flows into the tank body 101 and is purified within the foreign matter removing tank 110, the anaerobic filter bed tank 130, the contact filter bed tank 150, the treated water tank 170 and the sterilizing chamber 190 successively. Thereafter, the treated water is discharged to the outside of the tank body 101. In this embodiment, the "water to be treated" or "water" includes wastewater to be treated in each tank and water that flows in the process of treating the wastewater.

Foreign matter removing tank 110 is also referred to as "impurities removing tank" and is disposed in the most upstream portion of the tank body 101. Water to be treated flows into the foreign matter removing tank 110 through an inlet (not shown). Impurities as foreign matter in the water is separated from the water in the foreign matter removing tank 110 by means of a solid-liquid separating device such as an inflow baffle (not shown). The foreign matter removing tank 110 has a function of separating solid from liquid in the water to be treated. The water that has been treated in this foreign matter removing tank 110 is then transferred to the anaerobic filter bed tank 130 disposed downstream of the foreign matter removing tank 110.

Anaerobic filter bed tank 130 has a function of anaerobically treating (reducing) organic pollutant in the water to be treated. Typically, the anaerobic filter bed tank 130a is configured to have a filter bed packed with a predetermined amount of filter media. Anaerobic microbes are deposited on the filter media and anaerobically treat (reduce) organic pollutant in the water. Reduction of BOD (Biochemical Oxygen Demand) and weight reduction of sludge can be attained by this anaerobic treatment. The treated water is thereafter transferred to the anaerobic filter bed tank 130 disposed downstream of the contact filter bed tank 150.

Contact filter bed tank 150 has a unction of aerobically treating and filtering the water. The water that has been treated in this contact filter bed tank 150 is transferred to the treated water tank 170.

Treated water tank 170 has a function of temporally storing the water to be led into the sterilizing chamber 190. The water that has been temporally stored in the treated water tank 170 is thereafter transferred to the sterilizing chamber 190.

Sterilizing chamber 190 has a function of sterilizing the water that has been led from the treated water tank 170. Typically, the sterilizing chamber 190 has a chemical cartridge (not shown) filled with antiseptic (solid chlorinated agent). The water that has been sterilized in this sterilizing chamber 190 is discharged to the outside of the tank body 101.

Figure 2:
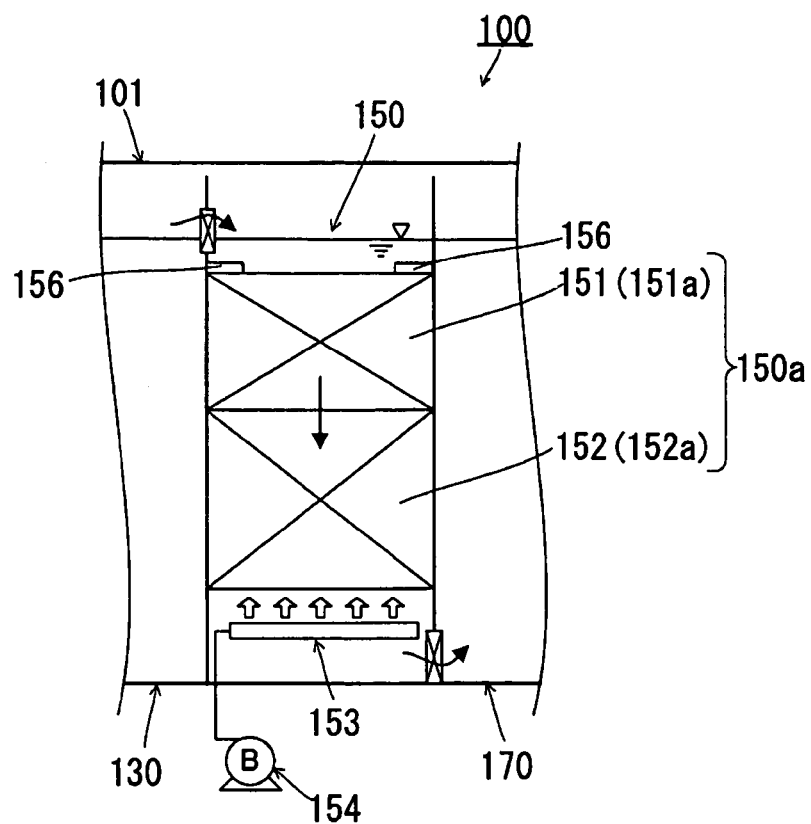
FIG. 2 is a sectional view showing the construction of a contact filter bed tank 150 shown in FIG. 1.
Figure 3:
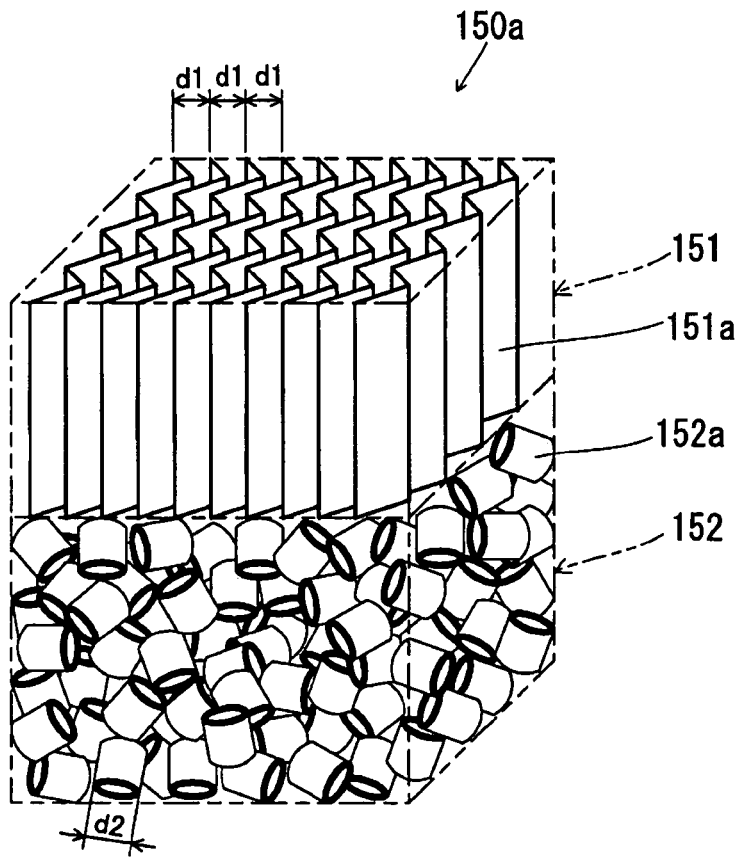
FIG. 3 is a perspective view of the internal structure of a packed region 150a of the contact filter bed tank 150 shown in FIG. 2.

Construction of the contact filter bed tank 150 will now be explained with reference to FIGS. 2 and 3. FIG. 2 shows the construction of the contact filter bed tank 150 shown in FIG. 1, in cross-section. FIG. 3 is a perspective view of the internal structure of a packed region 150a of the contact filter bed tank 150 shown in FIG. 2.

As shown in FIG. 2, the contact filter bed tank 150 has the packed region 150a in the flow path through which water to be treated flows downward from the upper part to the lower part of the tank. An air diffuser 153 is disposed below the packed region 150a.

The packed region 150a has a first packed part 151 and a second packed part 152. Specifically, the packed region 150a has a two-layer structure comprising the first packed part 151 (upper layer) and the second packed part 152 (lower layer). The packed region 150a is provided in the path of water to be treated.

Further, according to this embodiment, the air diffuser 153 is arranged below the second packed part 152 that forms the lower layer of the packed region 150a. The air diffuser 153 is connected to a blower 154. Compressed air is supplied from the blower 154 to the air diffuser 153. The air diffuser 153 serves to feed the compressed air upward from below the second packed part 152 through a plurality of air diffusion openings (not shown). The blower 154 is operated during normal operation (air diffusing operation) and backwashing operation. The blower 154 supplies a larger amount of air during backwashing operation than normal operation to below the backwashing region of the second packed part 152. The air diffuser 153 and the blower 154 form the "air diffusing arrangement" in this invention. Further, in the contact filter bed tank 150 in this embodiment, air that has been supplied from the air diffuser 153 disposed below the second packed part 152 is diffused in the second packed part 152 and then in the first packed part 151 so as to be supplied over the whole surface of the packed region 150a. The contact filter bed tank 150 thus constructed is also referred to as the "whole surface aeration type contact filter bed tank".

As shown in FIG. 3, in the first packed part 151, a plurality of corrugated plate-like contact materials 151a extend vertically and equidistantly parallel to each other at a regular spacing d1. In this state, the contact materials 151a are connected to each other into one block member. Biomembrane of aerobic microbes is deposited on the block of the corrugated plate-like contact materials 151a. The aerobic microbes deposited on the corrugated plate-like contact materials 151a contact with the water to be treated when the water flows downward through the first packed part 151. As a result, organic pollutant in the water to be treated is mainly aerobically treated (oxidized). The block of the corrugated plate-like contact materials 151a is a feature that corresponds to the "first biomembrane-deposited member" in this invention, and the first packed part 151 packed with the block of the corrugated plate-like contact materials 151a is a feature that corresponds to the "first packed part" in this invention.

Further, as shown in FIG. 3, the second packed part 152 is packed with a plurality of filter media 152a in random arrangements. Each of the filter media 152a has a cylindrical shape with a circular section (having an outer diameter d2). The wall surface of the filter media 152a has a luffa-like cylindrical form. Water to be treated flows downward through the second packed part 152 packed with the plurality of the filter media 152a during normal operation (air diffusing operation). At this time, SS (suspended solids) within the water is filtered mainly by the filter media 152a. The plurality of the filter media 152a packed in random arrangements is a feature that corresponds to the "second biomembrane-deposited member" in this invention, and the second packed part 152 packed with the plurality of the filter media 152a in random arrangements is a feature that corresponds to the "second packed part" in this invention.

According to this embodiment, the block of the corrugated plate-like contact materials 151a in the first packed part 151 directly presses from above on the plurality of the filter media 152a that are packed in random arrangements in the second packed part 152. In this manner, the corrugated plate-like contact materials 151a serve to prevent the filter media 152a from moving into the first packed part 151. Specifically, the block of the corrugated plate-like contact materials 151a is directly placed on the top of the plurality of the filter media 152a and engaged with an engaging member 156 (see FIG. 2) which is secured to the tank body 101. Further, the spacing d1 between the corrugated plate-like contact materials 151a is shorter than the outer diameter d2 of the filter media 152a. The outer diameter d2 of the filter media 152a here represents the maximum diameter of the filter media 152a, or typically the length in the longitudinal direction of the filter media 152a.

With the above-mentioned construction of the packed region 150a, the plurality of the filter media 152a are locked within the packed part 152 under the weight of the corrugated plate-like contact materials 151a and by means of the engaging member 156. Furthermore, the plurality of the filter media 152a are prevented from moving into the first packed part through the space between the corrugated plate-like contact materials 151a. With such a construction in which the block of the corrugated plate-like contact materials 151a directly presses on the plurality of the filter media 152a, the plurality of the filter media 152a can be locked within the second packed part 152 at a time by means of the block of the corrugated plate-like contact materials 151a. Therefore, any additional member specifically designed for locking the plurality of the filter media 152a is not necessary, so that the packed region 150a can be made simpler in structure.

Further, in this embodiment, the first packed part 151 packed with the block of the corrugated plate-like contact materials 151a has a first percentage of void larger than a second percentage of void of the second packed part 152 packed with the plurality of the filter media 152a. The first percentage of void is defined as the ratio of the volume of the voids in the first packed part 151 packed with the corrugated plate-like contact materials 151a to the entire volume of the first packed part 151 which is yet to be packed with the contact materials 151a. Similarly, the second percentage of void is defined as the ratio of the volume of the voids in the second packed part 152 packed with the filter media 152a to the entire volume of the second packed part 151 which is yet to be packed with the filter media 152a. Specifically, the second packed part 152 packed with the filter media 152a has a smaller percentage of void (or a larger specific surface area) than the first packed part 151 packed with the corrugated plate-like contact materials 151a. Further, the percentage of void decreases (or the specific surface area increases) as water to be treated flows downstream through the first packed part 151 and then the second packed part 152. Further, preferably, in this embodiment, the second percentage of void of the second packed part 152 may be set such that the second packed part 152 can perform a desired filtering function during normal operation and can atomize air that has been supplied from the air diffuser 153.

Such construction, in which the first packed part 151 forming the upper layer of the packed region 150a has a larger percentage of void than the second packed part 152 forming the lower layer, makes it possible to prevent the first packed part 151 from being clogged with biomembrane on the corrugated plate-like contact materials 151a, while biological treatment performance (aerobic treatment performance) of the first packed part 151 can be maintained. At this time, with the construction in which air that has been supplied from the air diffuser 153 can be atomized, oxygen dissolution efficiency with respect to the water to be treated can be enhanced. As a result, the biological treatment performance of the first packed part 151 can be improved. On the other hand, the second packed part 152 can perform a desired filtering function during normal operation. Further, the substance to be filtered which has been deposited on the filter media 152a in the backwashing region of the second packed part 152 is washed (backwashed) by a separating action of diffused air. The diffused air is supplied in a larger amount during backwashing operation than normal operation. Therefore, both the biological treatment performance and the filtering performance can be achieved in the packed region 150a and the clogging of the packed region 150a can be prevented.

Figure 4:
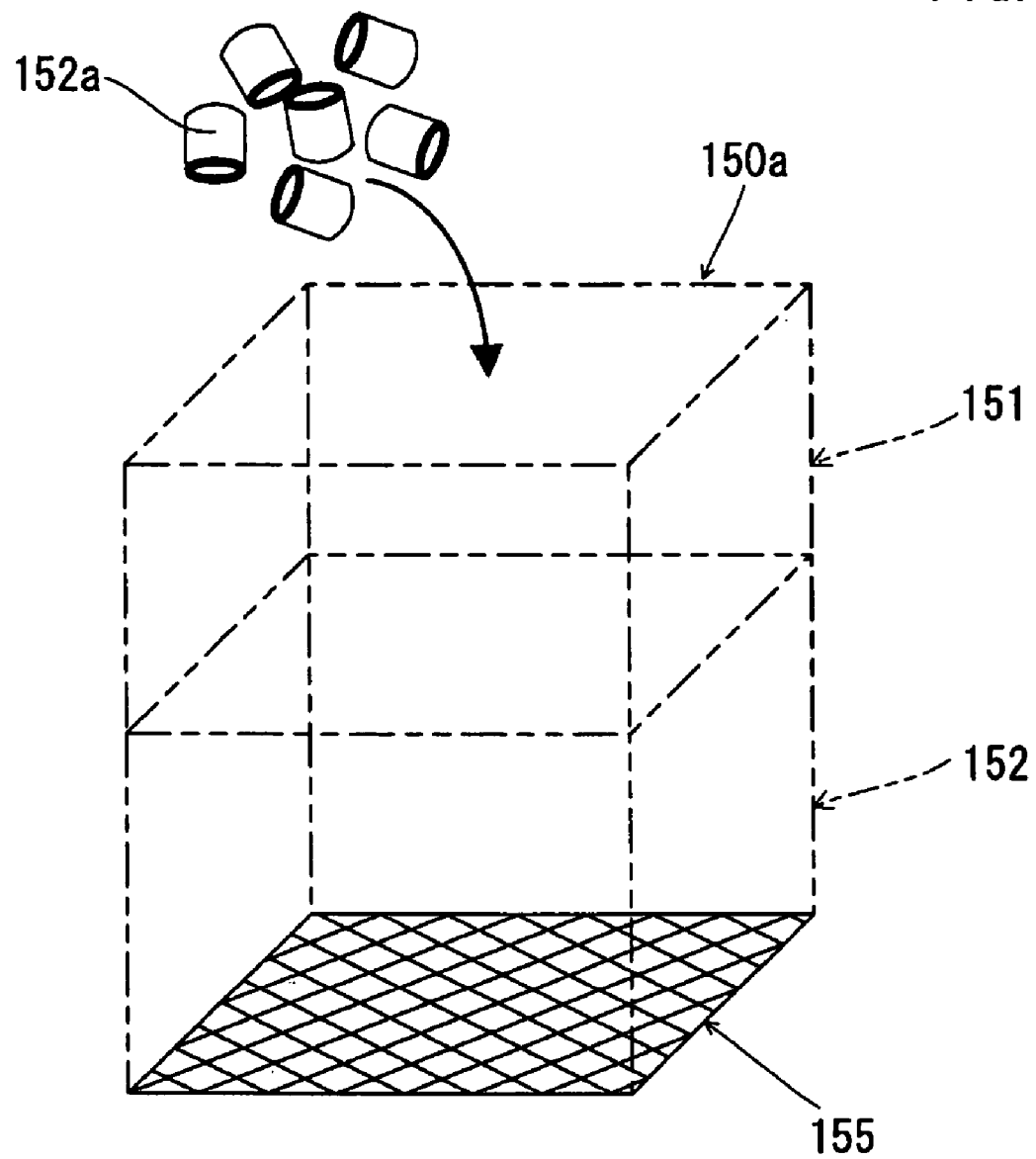
Figure 5:
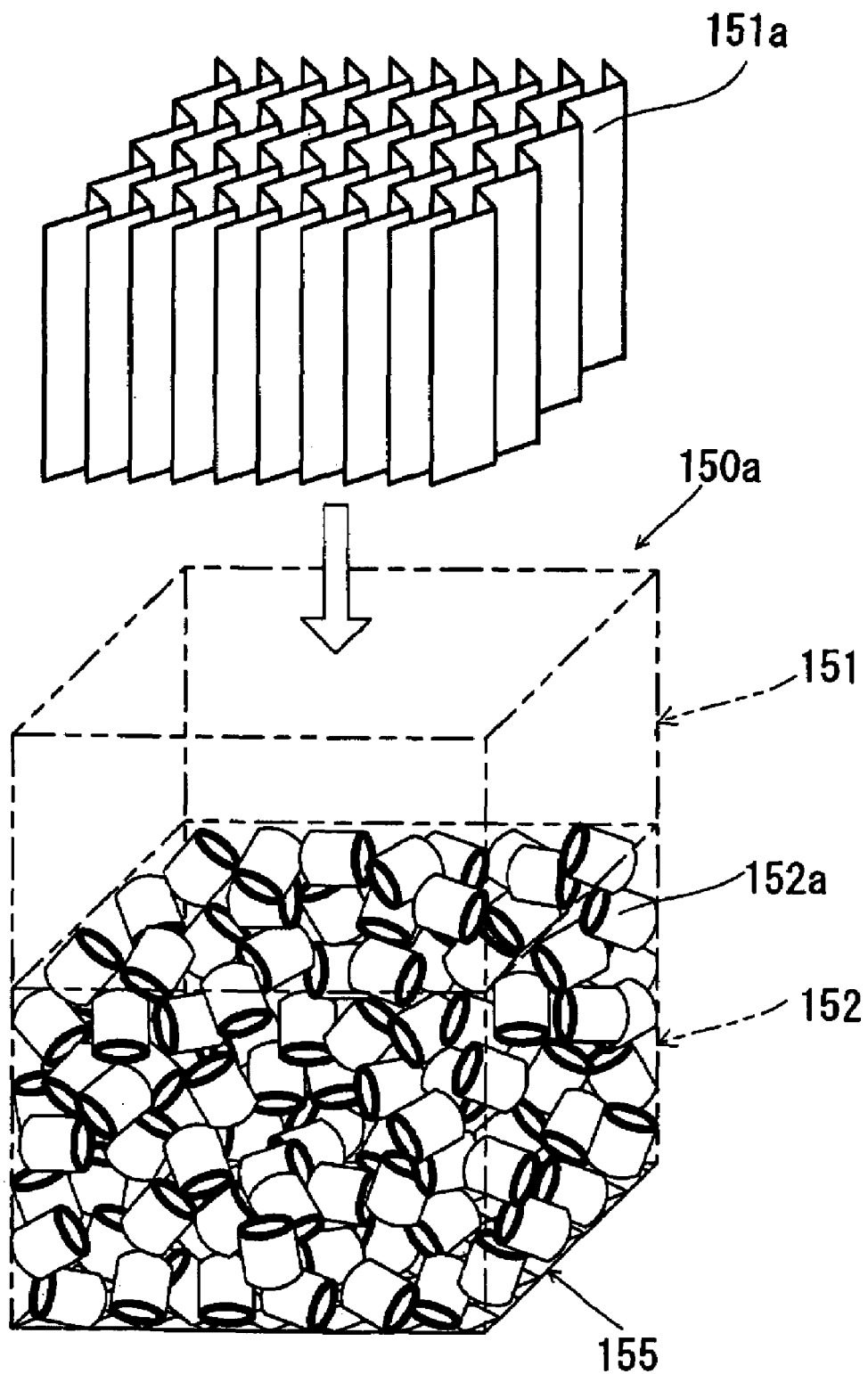

The work process of packing the packed region 150a of the contact filter bed tank 150 with the corrugated plate-lice contact materials 151a and the filter media 152a will now be explained with reference to FIGS. 4 and 5. FIG. 4 is a perspective view showing that the second packed part 152 of the packed region 150a shown in FIG. 3 is being packed with the filter media 152a. FIG. 5 is a perspective view showing that the first packed part 151 of the packed region 150a shown in FIG. 3 is being packed with the block of the corrugated plate-like contact materials 151a.

As shown in FIG. 4, a predetermined number of the filter media 152a are charged into the second packed part 152 from above the packed region 150a. Preparatory to this, a base net 155 is installed in the bottom of the second packed part 152. The base net 155 allows passage of the water and prevents passage of the filter media 152a. In this manner, the plurality of the filter media 152a that has been charged into the second packed part 152 is accumulated on the base net 155. Thus, the packing of the second packed part 152 with the filter media 152a is completed Thereafter, as shown in FIG. 5, the corrugated plate-like contact materials 151a which have been connected together into one block in advance are directly charged into the first packed part 151 from above the packed region 150a. At this time, the block of the corrugated plate-like contact materials 151a is directly placed on the plurality of the filter media 152a of which packing has been completed in advance. This construction in which the corrugated plate-like contact materials 151a are connected together into one block in preparatory to the packing process, is effective in improving the work efficiency in the packing and replacing processes. Further, the block of the corrugated plate-like contact materials 151a is engaged with the engaging member 156 (see FIG. 2) which is secured to the tank body 101. In this manner, an effective pressing force in locking the plurality of the filter media 152a within the second packed part 152 at a time under the weight of the corrugated plate-like contact materials 151a and by means of the engaging member 156 can be provided. If such locking of the filter media 152a can be attained simply under the weight of the corrugated plate-like contact materials 151a, the engaging member 156 may be omitted as necessary. Further, the corrugated plate-like contact materials 151a may be connected together into one block during the process of packing them into the first packed part 151, as necessary.

This invention is not limited to the above-mentioned embodiment, but various applications or modifications may be made. For example, the following embodiments may be provided by application of the above-mentioned embodiment.

In the above embodiment, the first packed part 151 and the second packed part 152 have been described as being packed with the corrugated plate-like contact materials 151a (first biomembrane-deposited members) and the filter media 152a (second biomembrane-deposited members) having a luffa-like cylindrical form, respectively. However, according to the present teachings, it is essential to configure that the first biomembrane-deposited members are packed in the form of one block into the first packed part and can directly press from above on the plurality of the second biomembrane-deposited members which are packed in random arrangements in the second packed part. The kind and shape of the biomembrane-deposited members to be packed in the first and the second packed parts may be appropriately changed as necessary.

Further, according to this embodiment, the packed region 150a of the contact filter bed tank 150 has been described as having a two-layer structure comprising the first packed part 151 and the second packed part 152. However, in this invention, the packed region 150a may have a multi-layer structure having three or more layers, including the first packed part 151 and the second packed part 152. For example, a packed region 150b as shown in FIG. 6 may be provided in place of the packed region 150a shown in FIG. 2.

Figure 6:
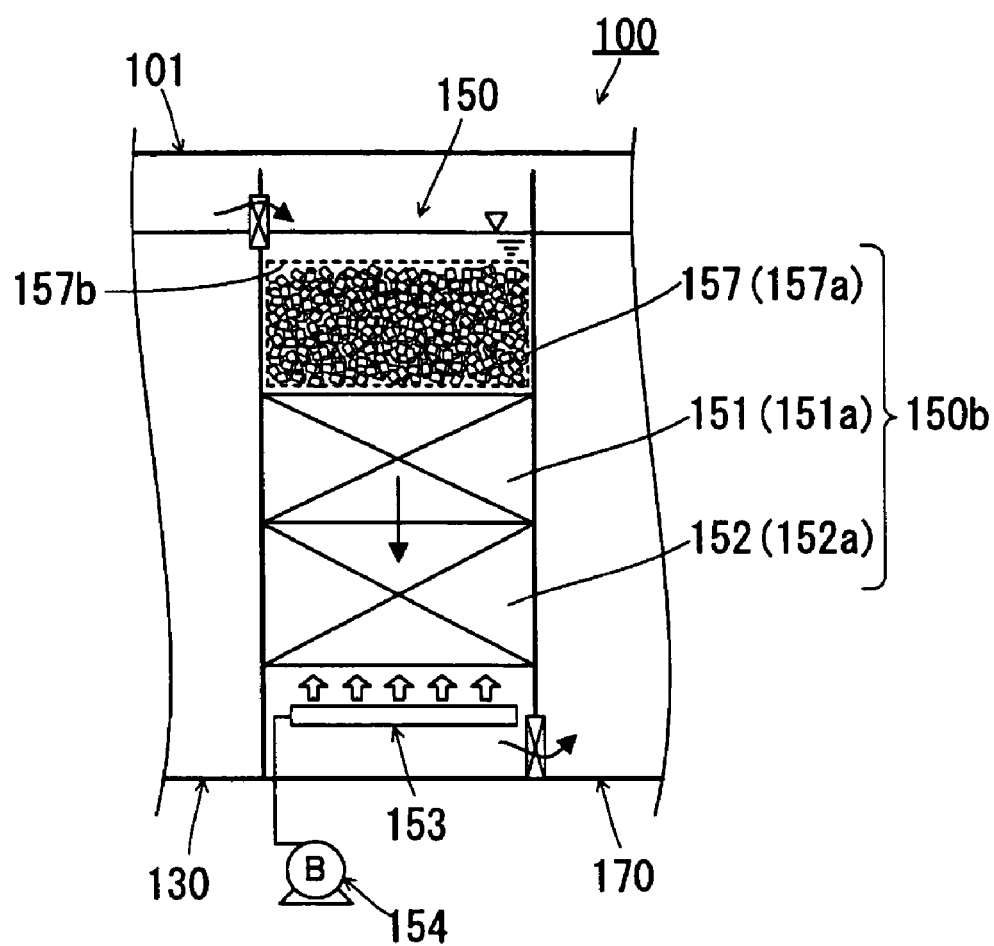
FIG. 6 shows the construction of a packed region 150b in another embodiment of the packed region 150a shown in FIG. 2.

The packed region 150b shown in FIG. 6 also has the first and the second packed parts 151 and 152 shown in FIG. 2 and additionally includes a third packed part 157 on the first packed part 151. Specifically, the packed region 150b has a three-layer structure comprising the first packed part 151 (middle layer), the second packed part 152 (lower layer) and the third packed part 157 (upper layer). The third packed part 157 is packed with a plurality of granular carriers 157a packed in one box-like member 157b. The granular carriers 157a have a hollow cylindrical shape. Biomembrane of aerobic microbes is deposited on the granular carriers 157a and aerobically decompose organic pollutant. The box-like member 157b is formed of perforated plates that allow passage of the water to be treated and prevent passage of the granular carriers 157a. The box-like member 157b is packed with the plurality of the granular carriers 157a to such an extent that the granular carriers 157a can move within the box-like member 157b. In order to pack the plurality of the granular carriers 157a, the box-like member 157b may be packed with the plurality of the granular carriers 157a in advance and installed in the third packed part 157. Alternatively, the box-like member 157b may be installed in the third packed part 157 in advance and the plurality of the granular carriers 157a may be charged into the box-like member 157b.

According to this representative embodiment, biological treatment performance in the packed region 151b can be further enhanced by providing the third packed part 157 in addition to the first and the second packed parts 151 and 152. Further, in this embodiment, the plurality of the granular carriers 157a are packed in the one box-like member 157b in advance and directly placed on the first packed part 151. With this construction, not only the work efficiency in the processes of packing and replacing the corrugated plate-like contact materials 151a in the first packed part 151, but the work efficiency in the processes of packing and replacing the granular carriers 157a in the third packed part 157 can be enhanced.

DESCRIPTION OF NUMERALS 100 wastewater treatment apparatus
101 tank body
110 foreign matter removing tank
130 anaerobic filter bed tank
150 contact filter bed tank
150a, 150b packed region
151 first packed part
151a corrugated plate-like contact material
152 second packed part
152a filter media
153 air diffuser
154 blower
155 base net
156 engaging member
157 third packed part
157a granular carrier
157b box-like member
170 treated water tank
190 sterilizing chamber

What we claim is:

1. A water treatment apparatus in the form of a septic tank including, in series from an upstream side, a foreign matter removing tank, an anaerobic filter bed tank, a packed region provided in a path of water to be treated, a treated water tank and a sterilizing chamber, the packed region comprising:
    a first packed part arranged in the packed region,
    a block of first biomembrane-deposited members that are packed in the first packed part,
    a second packed part that is arranged under the first packed part, and
    a plurality of second biomembrane-deposited members that are packed in the second packed part,
    wherein the first biomembrane-deposited members press on the second biomembrane-deposited members from above, thereby preventing the second biomembrane-deposited members from moving into the first packed part.

2. The water treatment apparatus as defined in claim 1, wherein the first biomembrane deposited members directly press on the second biomembrane-deposited members from above.

3. The water treatment apparatus as defined in claim 1, wherein the first biomembrane-deposited members comprise a plurality of plate members, the plate members extending vertically and parallel to each other and being connected to each other into one block in the first packed part.

4. The water treatment apparatus as defined in claim 1, wherein the first biomembrane-deposited members comprise a plurality of plate members, the plate members extending vertically and equidistantly parallel to each other and being connected to each other into one block in the first packed part.

5. The water treatment apparatus as defined in claim 1, wherein the first biomembrane-deposited members comprise a plurality of corrugated plate members, the corrugated plate members extending vertically and parallel to each other and being connected to each other into one block in the first packed part.

6. The water treatment apparatus as defined in claim 1, further comprising an engaging member that are secured to the first packed part, wherein the first biomembrane-deposited members comprise a plurality of plate members, the plate members extending vertically and parallel to each other and being connected to each other into one block in the first packed part and wherein the engaging member locks and positions the first biomembrane-deposited members in the first packed part.

7. The water treatment apparatus as defined in claim 1, wherein each of the second biomembrane-deposited members has a cylindrical shape with a circular section.

8. The water treatment apparatus as defined in claim 1, wherein the second biomembrane-deposited members have a wall surface having a cylindrical form.

9. The water treatment apparatus as defined in claim 1, wherein a base net is further provided in the bottom of the second packed part and prevents the plurality of the second biomembrane-deposited members from moving downward out of the second packed part.

10. The water treatment apparatus as defined in claim 1, wherein the first biomembrane-deposited members comprise a plurality of plate members, the plate members extending vertically and equidistantly parallel to each other and being connected to each other into one block in the first packed part, and wherein the spacing between the plate members is substantially shorter than the outer diameter of the second biomembrane-deposited members packed in the second packed part.

11. The water treatment apparatus as defined in claim 1, wherein the first biomembrane-deposited members comprise a plurality of plate members, the plate members being connected to each other into one block and thereafter packed in the first packed part.

12. The water treatment apparatus as defined in claim 1, wherein the first packed part packed with the first biomembrane-deposited members has a larger percentage of void than the second packed part packed with the second biomembrane-deposited members.

13. The water treatment apparatus as defined in claim 1, further comprising an air diffuser that is disposed below the second packed part and supplies air into the first and second packed parts.

14. The water treatment apparatus as defined in claim 1, further comprising an air diffuser that is disposed below the second packed part and supplies air into the first and second packed parts, wherein the air diffuser provides formation of biomembrane of aerobic microbes on the first and second biomembrane-deposited members.

15. The water treatment apparatus as defined in claim 1, further comprising a third packed part that is disposed within the packed region on the upstream side of the first packed part.

16. The water treatment apparatus as defined in claim 1, further comprising a third packed part that is disposed within the packed region on the upstream side of the first packed part, a plurality of granular carriers packed in the third packed part, and a box-like member that houses the granular carriers while preventing the granular carriers from moving out of the box-like member.

17. The water treatment apparatus as defined in claim 1, wherein the packed region is designed as an aerobic filter bed tank that aerobically treats the water to be treated, and wherein the water treatment apparatus further includes a housing that houses the foreign matter removing tank, the anaerobic filter bed tank, the packed region, the treated water tank and the sterilizing chamber as an integral body.

18. A septic tank, comprising:
a foreign matter removing tank provided in a path of water to be treated,
an anaerobic filter bed tank disposed downstream of the foreign matter removing tank,
an aerobic filter bed tank disposed downstream of the anaerobic filter bed tank,
a treated water tank disposed downstream of the aerobic filter bed tank,
a sterilizing chamber disposed downstream of the treated water tank,
a first packed part arranged in the aerobic filter bed tank,
biomembrane-deposited members that are packed in the first packed part,
a second packed part placed under the first packed part,
a plurality of granular carriers that are packed in the second packed part in random arrangements and pressed on from above by the biomembrane-deposited members, and
a housing that houses the foreign matter removing tank, the anaerobic filter bed tank, the packed region, the treated water tank and the sterilizing chamber and defines a contour of the septic tank.

* * * * *